No. 723,204. PATENTED MAR. 17, 1903.
C. N. LEONARD.
PNEUMATIC STACKER.
APPLICATION FILED OCT. 4, 1902.
NO MODEL. 3 SHEETS—SHEET 1.
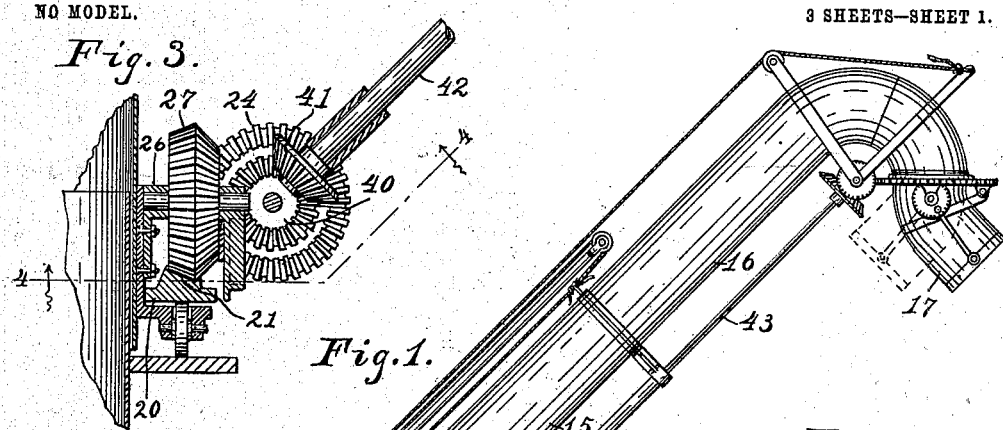
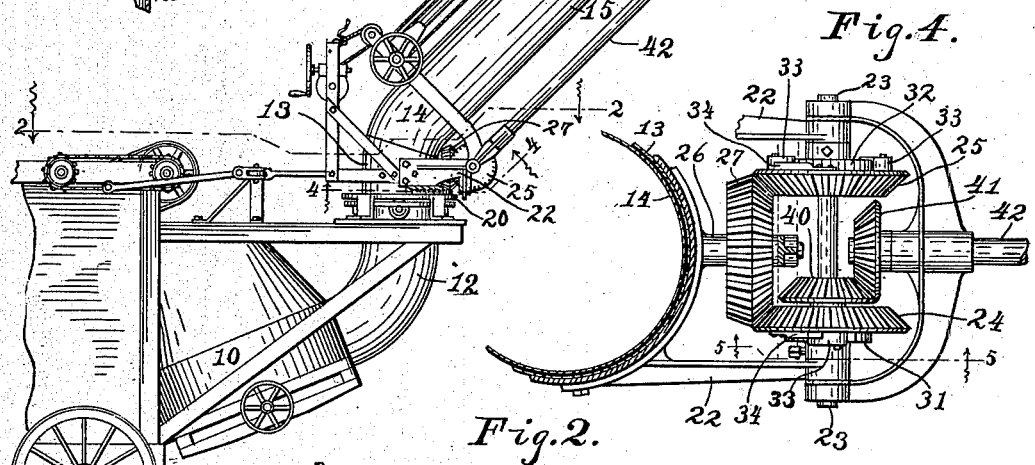
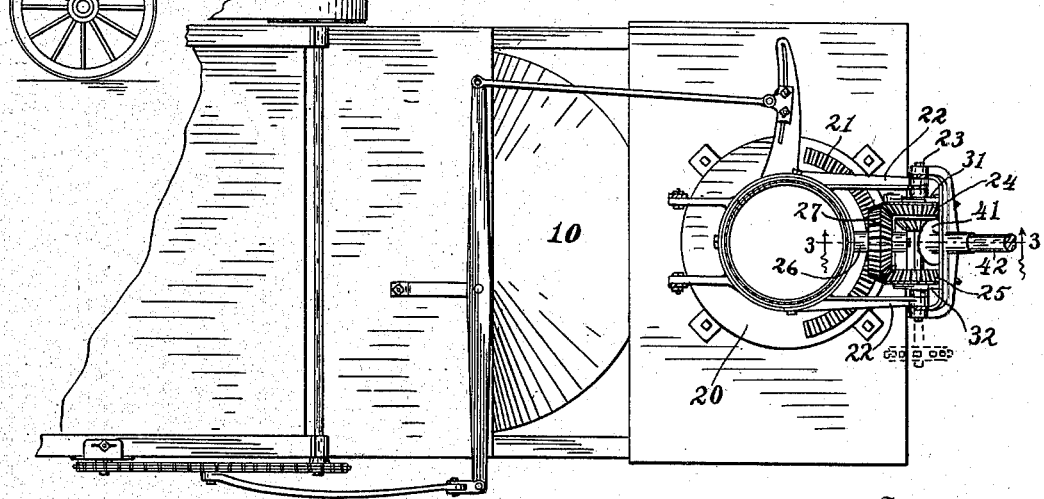
Witnesses
J. A. Walsh
Frank A. Fahle
Inventor
Charles N. Leonard.
By Bradford & Hood,
Attorneys No. 723,204. PATENTED MAR. 17, 1903.
C. N. LEONARD.
PNEUMATIC STACKER.
APPLICATION FILED OCT. 4, 1902.
NO MODEL. 3 SHEETS—SHEET 2.

Witnesses
J. A. Walsh
Frank A. Fahle

Inventor
Charles N. Leonard.
By Bradford & Hood,
Attorneys

No. 723,204. PATENTED MAR. 17, 1903.
C. N. LEONARD.
PNEUMATIC STACKER.
APPLICATION FILED OCT. 4, 1902.
NO MODEL. 3 SHEETS—SHEET 3.

Witnesses
J. A. Walsh
Frank A. Fahle

Inventor
Charles N. Leonard.
By Bradford & Hood,
Attorneys

UNITED STATES PATENT OFFICE.

CHARLES N. LEONARD, OF INDIANAPOLIS, INDIANA.

PNEUMATIC STACKER.

SPECIFICATION forming part of Letters Patent No. 723,204, dated March 17, 1903.

Application filed October 4, 1902. Serial No. 125,888. (No model.)

*To all whom it may concern:*

Be it known that I, CHARLES N. LEONARD, a citizen of the United States, residing at Indianapolis, in the county of Marion and State of Indiana, have invented certain new and useful Improvements in Pneumatic Stackers, of which the following is a specification.

My present invention relates to pneumatic stackers; and it consists in a means whereby the revolving delivery-nozzle, such as shown and described in my pending application, Serial No. 102,722, filed April 14, 1902, may be caused to revolve continuously in one direction, while the main straw-stacker trunk or chute, on which said revolving discharge-nozzle is mounted, travels back and forth from side to side, as will be hereinafter more particularly described and claimed.

Figure 5:
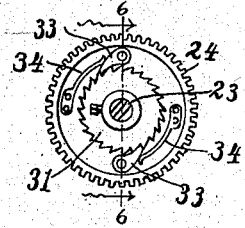
Figure 6:
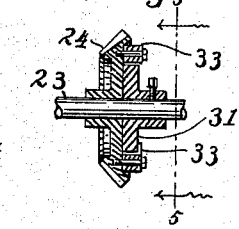
Figure 7:
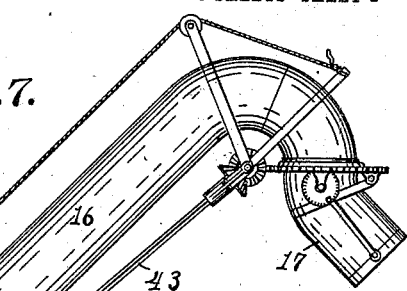
Figure 8:
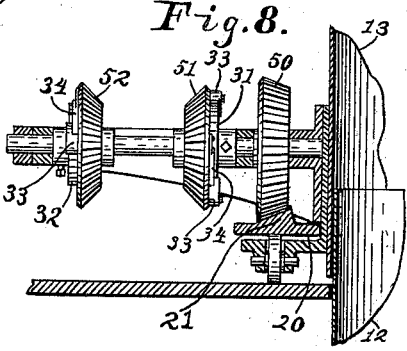
Figure 9:
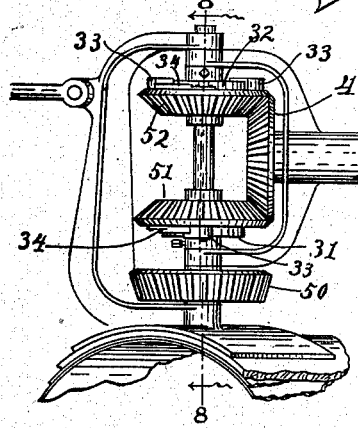
Figures 10, 11:
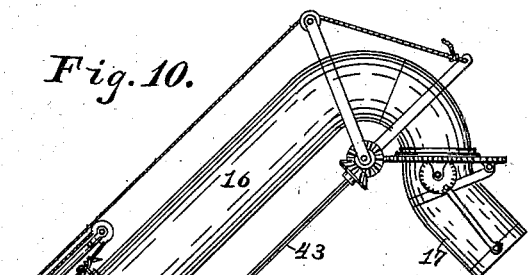
Figure 12:
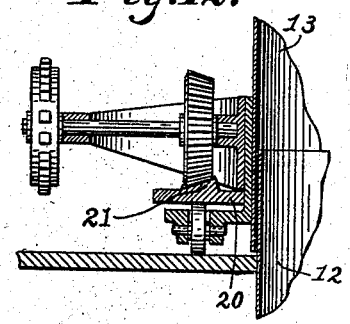
Figure 13:
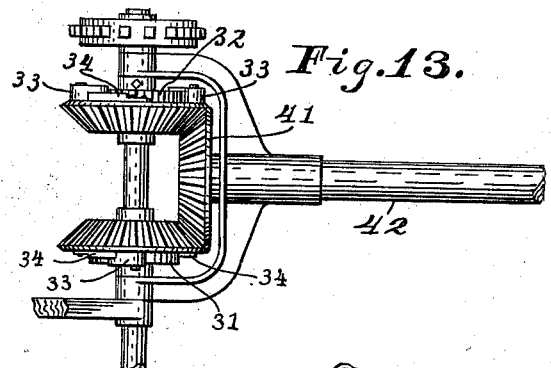
Figure 15:
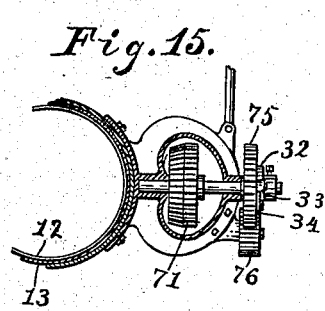
Figure 14:
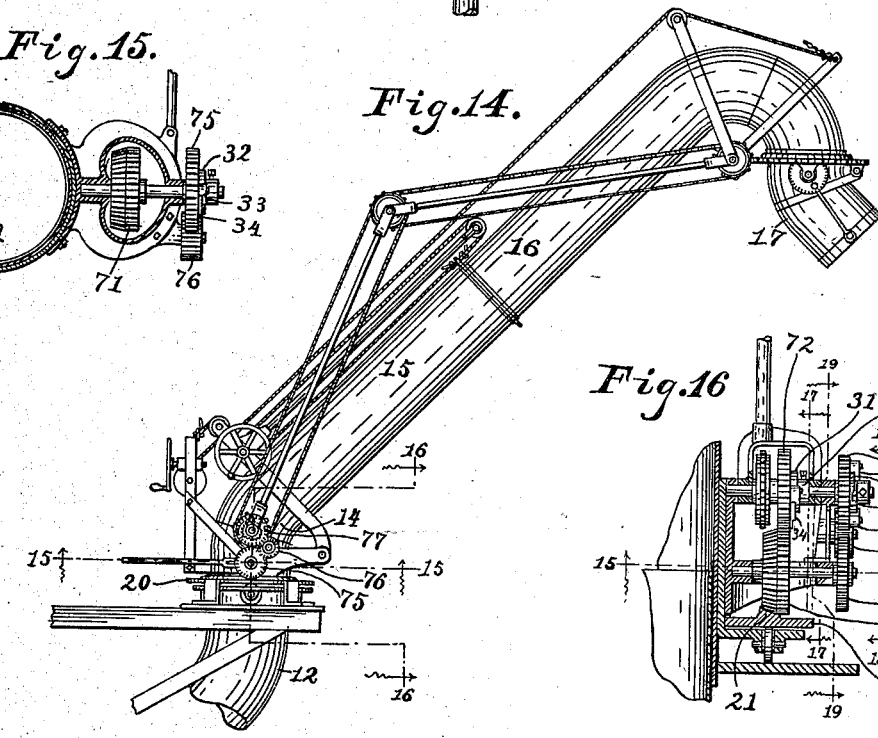
Figure 16:
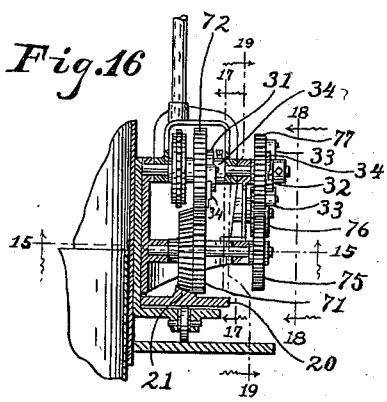
Figure 17:
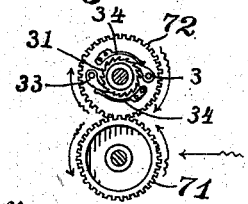
Figure 18:
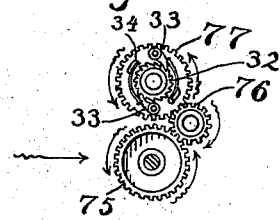
Figure 19:
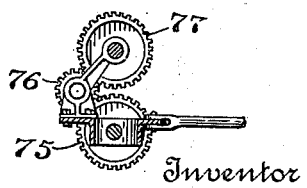

Referring to the accompanying drawings, which are made a part hereof, and on which similar reference characters indicate similar parts, Figure 1 is a side elevation of a pneumatic stacker provided with a revolving discharge-nozzle and means for operating the same embodying my said invention, said stacker being shown in position as when attached to a threshing-machine or separator and a fragment of the rear of such separator being also shown; Fig. 2, a top or plan view of the turn-table mechanism and immediately adjacent parts as seen when looking downwardly from the dotted line 2 2 in Fig. 1; Fig. 3, a detail vertical sectional view through the gearing as seen when looking in the direction indicated by the arrows from the dotted line 3 3 in Fig. 2; Fig. 4, an under side plan view of said gearing as seen when looking in the direction indicated by the arrows from the dotted line 4 4 in Figs. 1 and 3; Fig. 5, a face view of one of the bevel gear-wheels and its clutches as seen from the dotted line 5 5 in Figs. 4 and 6; Fig. 6, a detail sectional view of such a gear-wheel and its clutch at the point indicated by the dotted lines 6 6 in Fig. 5; Fig. 7, a side elevation similar to Fig. 1, but showing an alternative construction and arrangement of the driving-gearing; Fig. 8, a central sectional view of the said alternative form of gearing as seen when looking in the direction indicated by the arrows from the dotted line 8 8 in Figs. 7 and 9; Fig. 9, an under side plan view of such a gearing as seen when looking upwardly in the direction indicated by the arrows from the dotted line 9 9 in Fig. 7; Fig. 10, a side elevation of another alternative form of gearing for accomplishing the purpose of my invention similar in other respects to Figs. 1 and 7; Fig. 11, a top or plan view of the form of gearing shown in Fig. 10 as seen when looking downwardly from the dotted line 11 11 in Fig. 10; Fig. 12, a detail sectional view through said form of gearing as seen when looking in the direction indicated by the arrows from the dotted line 12 12 in Fig. 11; Fig. 13, a plan view of another portion of the gearing shown in Fig. 10 as seen from the dotted line 13 13 therein; Fig. 14, a side elevation of another alternative form of gearing and power connections for operating my said continuously-revolving discharging-nozzle; Fig. 15, a detail plan view of the same as seen from the dotted line 15 15 in Figs. 14 and 16; Fig. 16, a detail vertical sectional view as seen when looking in the direction indicated by the arrows from the dotted line 16 16 in Fig. 14, and Figs. 17, 18, and 19 detail face views of the trains of gearing embodied in the construction illustrated in Figs. 14, 15, and 16 just described.

The pneumatic stacker illustrated consists in a general way of substantially the same parts as usual, including a fan-casing 10, (the fan therein not being shown,) a stationary duct-section 12, leading from said fan-casing up to the turn-table point, and a main trunk or chute united thereto by elbow-sections 13 and 14 and consisting of other duct-sections 15 and 16, revolubly and vibratably mounted at the turn-table point and leading thence outwardly to the discharging-point of the apparatus and there provided with the revoluble discharge-nozzle 17, which is more particularly shown and described in my pending application above referred to and which is driven by suitable power connections from mechanism at the turn-table point.

As before stated, my present invention consists in a means for causing the discharge-nozzle 17 to continuously rotate in one direction, while the main straw-stacker trunk or duct is caused to oscillate or swing from side to side, both being actuated from the same primary driving means. Upon an annular plate 20, (see especially Fig. 2,) located at the turn-table point, is a segmental rack 21. The mechanism for driving the main stacker trunk or duct back and forth from side to side is substantially the same as that shown and described in another pending application, Serial No. 102,721, filed by me April 14, 1902. Secured to the lower elbow-section 13 are arms or brackets 22, in the outer ends of which are bearings for a shaft 23, upon which two bevel gear-wheels 24 and 25 are loosely mounted. A stud-shaft 26 is also rigidly secured to the elbow-section 13 and carries a loosely-mounted bevel gear-wheel 27, which in my preferred construction, as shown in Figs. 1 to 6, inclusive, engages both with the segmental rack-bar 21 and with both the bevel gear-wheels 24 and 25. Alongside these gear-wheels are the fixedly-mounted clutch-wheels 31 and 32. These clutch-wheels, as best shown in Fig. 5, have ratchet peripheries, and pawls 33 are adapted to engage with the teeth of the ratchets when it is attempted to revolve the gear-wheels in one direction and to slip over them when it is attempted to revolve said gear-wheels in the other direction, said pawls being held into engagement by suitable springs 34. As will be readily understood, the gear-wheels 24 and 25 when driven by the gear-wheels 27 move oppositely to each other, and the motion of all these wheels is simultaneously reversed. The ratchet-and-pawl arrangement is such, however, that in the case of one of the wheels 24 25 it is adapted to operatively engage when the wheel 27 is revolving in one direction, and in the case of the other of said gear-wheels 24 25 the ratchet-and-pawl arrangement is adapted to operatively engage when the wheel 27 is moving in the other direction, and this, as will be readily understood, produces a continuous movement in one direction of the shaft 23. A bevel-pinion 40 is fixedly mounted on the shaft 23 and engages with a corresponding pinion 41, which is fixedly mounted on the shaft 42, leading out in the direction of the discharging-nozzle 17. This shaft is therefore also propelled continuously in one direction. Where, as in the case illustrated, the main straw trunk or duct is made in two telescoping sections, this shaft is made hollow and a second telescoping shaft-section 43 continues on to the discharge-nozzle-driving mechanism. In cases where the straw-delivery trunk or duct is formed in one piece, however, this shaft could also be continuous and in a single piece.

The train of gearing for immediately operating the revolving discharging-nozzle 17 may be of any appropriate form. That shown is substantially the same as is illustrated in my said application Serial No. 102,722, above referred to, and consequently will not be further described. The result of the present arrangement is that the said straw-discharging nozzle 17 is driven continuously in one direction, while the straw-stacker trunk or duct as a whole swings back and forth from side to side in an ordinary and well-known manner.

In Figs. 7, 8, and 9 I have illustrated an alternative mechanism for producing the same result. In the construction illustrated in these figures gear-wheels 50, 51, and 52 correspond to the gear-wheels 27, 24, and 25 in the principal arrangement, which has been described, but are all mounted on a single shaft, while the bevel-pinion 41 engages directly with the gear-wheels 51 52 instead of with a separate intermediate pinion. The clutch-and-pawl arrangements are the same. In this arrangement the telescopic shaft 42 43 runs at an angle with the main trunk or chute sections 15 16 and is arranged at one side of said trunk or duct instead of directly underneath.

In Figs. 10 to 13, inclusive, I have illustrated another alternative construction. In this the position of the shaft 42 43 is brought out to one side, as in the case last described, and in addition is brought down into parallel relation to the main straw-delivery trunk or duct 15 16, as in Fig. 1. This involves the use of another short shaft as a part of the driving mechanism, the two shafts being connected in the illustration shown by a sprocket-chain or belt 60. The relations of parts embodied in this arrangement is indicated in Fig. 2, where the shaft 23 is shown as extended, with a sprocket-wheel on the end, by means of dotted lines.

In Figs. 14 to 19, inclusive, I have illustrated still another alternative mechanism for producing the same result, the same consisting mainly in the substitution for the bevel gear-wheels hereinbefore described of two trains of spur gear-wheels, one consisting of two such wheels 71 and 72 (see especially Fig. 17) and the other consisting of three such wheels 75, 76, and 77, (see particularly Figs. 18 and 19,) the clutch-and-pawl arrangements being in all cases substantially the same and the two varieties of gear-trains being, as will be readily understood by those skilled in such matters, the equivalents of each other, so that their operation, which will also be readily understood, need not be further described herein.

Other constructions of the gearing will readily occur to the skilled mechanic, and I desire to be understood as claiming all such to be within the scope of my invention, as I believe myself to be the first to have produced a mechanism for driving a straw-discharging nozzle continuously in one direction, operated in connection with mechanism for driving the main straw-delivery trunk or duct as a whole back and forth through a reciprocal path.

In Fig. 14 I have illustrated also an alternative power-transmission device leading from the gearing at the turn-table point to the gearing immediately driving the discharging-nozzle; but as this matter is not a part of the invention intended to be covered by the present application, being only shown as an illustration of the fact that alternative forms of power transmissions can be employed, it will not be further described herein.

Having thus fully described my said invention, what I claim as new, and desire to secure by Letters Patent, is—

1. The combination, in a pneumatic stacker, of a main delivery trunk or duct, a discharging-nozzle mounted on the end thereof, mechanism for swinging said delivery-duct back and forth from side to side, and other mechanism operated therefrom and embodying reversing devices, for driving said discharging-nozzle continuously in one direction.

2. The combination, in a pneumatic stacker, of the main trunk or duct, means for moving said main duct back and forth, a segmental rack situated at the turn-table point of such stacker, a gear-wheel mounted on a shaft carried by the reversely-moving trunk or duct and engaging with said segmental rack whereby it is driven, a train of reversing-gearing, power connections leading therefrom, and a revolving discharging-nozzle at the outer end of the main duct operated by said power connections whereby said nozzle is driven continuously in one direction by mechanism operated by the reversely-moving duct.

3. The combination, in a pneumatic stacker, of the swinging main delivery-duct, a revoluble discharging-nozzle mounted on the end thereof, mechanism for revolubly moving said discharging - nozzle power connections leading therefrom to the turn-table point of the stacker, and means located at said point and actuated by the swinging motion of the main delivery-duct for driving said mechanism continuously in one direction.

4. The combination, in a pneumatic stacker, of a horizontally - swinging main delivery trunk or duct, a stationary segmental rack positioned alongside said duct at the turn-table point, a stud-shaft secured to said swinging duct just above said rack, a gear-wheel mounted on said shaft and engaging with said rack, means for horizontally moving the trunk or duct, a train of double-acting gearing driven from said gear-wheel, a revoluble discharging-nozzle mounted on the outer end of said trunk or duct, gearing adapted to revolve the same, and power connections extending from said gearing back to the gearing operated from the segmental rack, whereby an oscillatory motion of the trunk and a continuous motion in one direction of the nozzle are synchronously secured.

5. The combination, in a pneumatic stacker, of the swinging main delivery-duct, a revoluble discharging - nozzle mounted in the end thereof, and means actuated by the swinging movement of the main delivery-duct for rotating said nozzle continuously in one direction.

In witness whereof I have hereunto set my hand and seal, at Indianapolis, Indiana, this 26th day of September, A. D. 1902.

CHARLES N. LEONARD. [L. S.]

Witnesses:
CHESTER BRADFORD,
JAMES A. WALSH.